(12) United States Patent
McKivergan

(10) Patent No.: US 10,162,040 B1
(45) Date of Patent: Dec. 25, 2018

(54) ULTRA-WIDEBAND LOW-PROFILE ELECTRONIC SUPPORT MEASURE ARRAY

(71) Applicant: BAE SYSTEMS Information and Electronic Systems Integration Inc., Nashua, NH (US)

(72) Inventor: Patrick D. McKivergan, Londonderry, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/665,748

(22) Filed: Aug. 1, 2017

(51) Int. Cl.
*G01S 1/16* (2006.01)
*H04B 7/0426* (2017.01)
*H01Q 21/00* (2006.01)

(52) U.S. Cl.
CPC ............... *G01S 1/16* (2013.01); *H04B 7/043* (2013.01); *H01Q 21/0031* (2013.01)

(58) Field of Classification Search
CPC ........ H01Q 15/02; H01Q 19/062; H01Q 3/46; H01Q 19/08; H01Q 21/0006; H01Q 3/44; H01Q 13/02; H01Q 15/0086; H01Q 15/04; H01Q 15/10; H01Q 15/22; H01Q 15/23; H01Q 17/001; H01Q 19/09; H01Q 19/104; H01Q 1/38; H01Q 21/0087; H01Q 21/065; H01Q 25/00; H01Q 3/245; H01Q 3/30; H01Q 5/35; H01Q 5/55; H01Q 9/08

USPC .... 343/756, 755, 779, 872, 909, 910, 911 R, 343/912
See application file for complete search history.

(56) References Cited

U.S. PATENT DOCUMENTS

| | | | | |
|---|---|---|---|---|
| 4,220,957 A * | 9/1980 | Britt | ..................... | H01Q 19/065 343/755 |
| 5,313,216 A * | 5/1994 | Wang | ..................... | H01Q 9/27 343/700 MS |
| 5,453,752 A * | 9/1995 | Wang | ..................... | H01Q 1/38 343/700 MS |
| 5,883,602 A * | 3/1999 | Volman | ..................... | H01Q 15/22 343/755 |
| 6,356,246 B1 * | 3/2002 | Nakamura | ..................... | H01Q 15/08 343/909 |
| 9,065,176 B2 * | 6/2015 | Wang | ..................... | H01Q 11/105 |
| 2004/0160382 A1 * | 8/2004 | Rawnick | ..................... | H01Q 3/44 343/909 |
| 2007/0001918 A1 * | 1/2007 | Ebling | ..................... | G01S 13/931 343/753 |

* cited by examiner

*Primary Examiner* — Linh V Nguyen
(74) *Attorney, Agent, or Firm* — Davis & Bujold, PLLC

(57) ABSTRACT

The system and method for using a wideband dielectric lens array to instantaneously and unambiguously determining azimuthal angle of arrival (AoA) of RF energy over a frequency bandwidth of greater than four octaves. By forming two omnidirectional modes with a constant and linear phase response versus azimuth respectively, the AoA of the incident RF signal can be determined unambiguously using a one or two channel receiver architecture that is capable of measuring the phase between the two modal outputs.

20 Claims, 10 Drawing Sheets

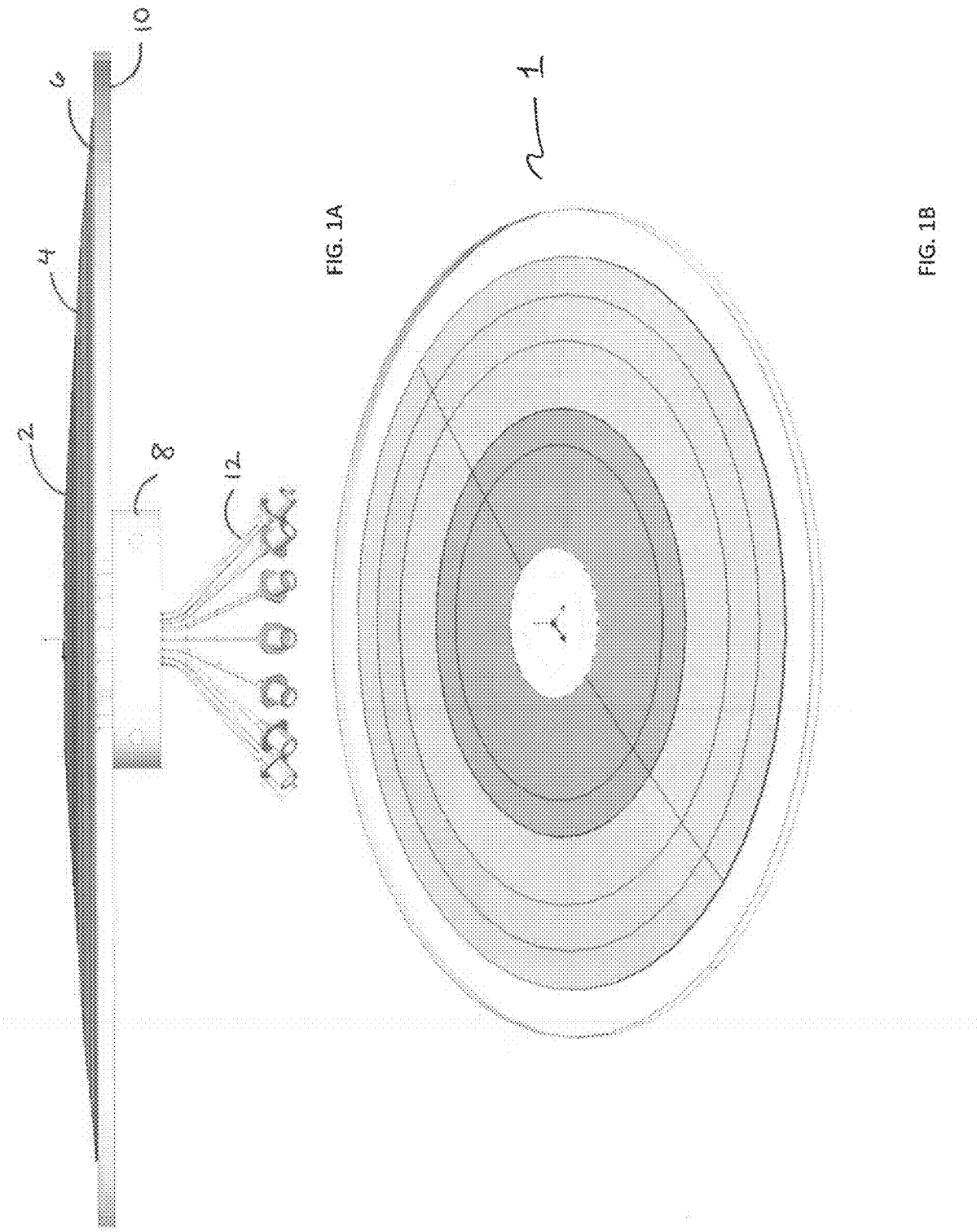

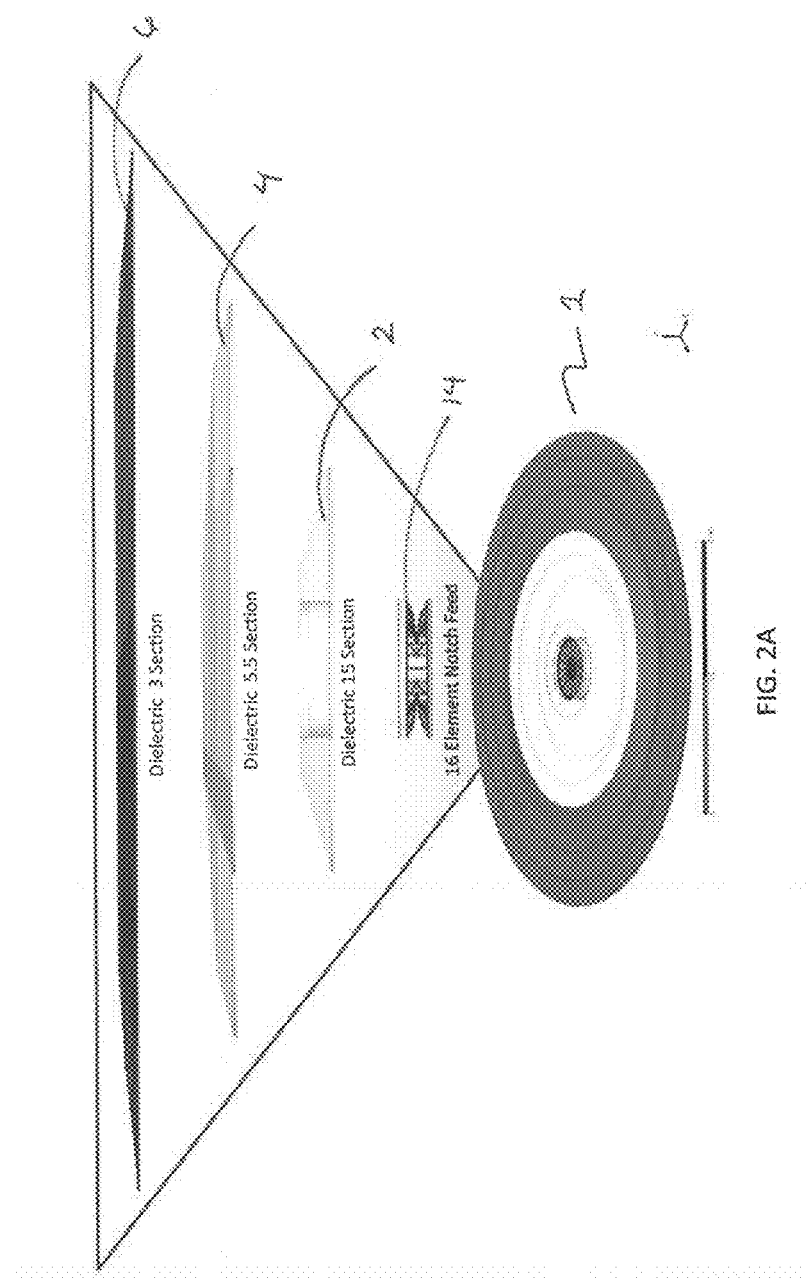
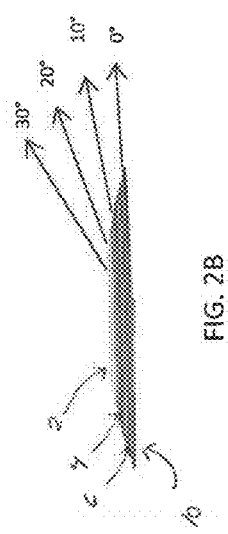
FIG. 2A
FIG. 2B

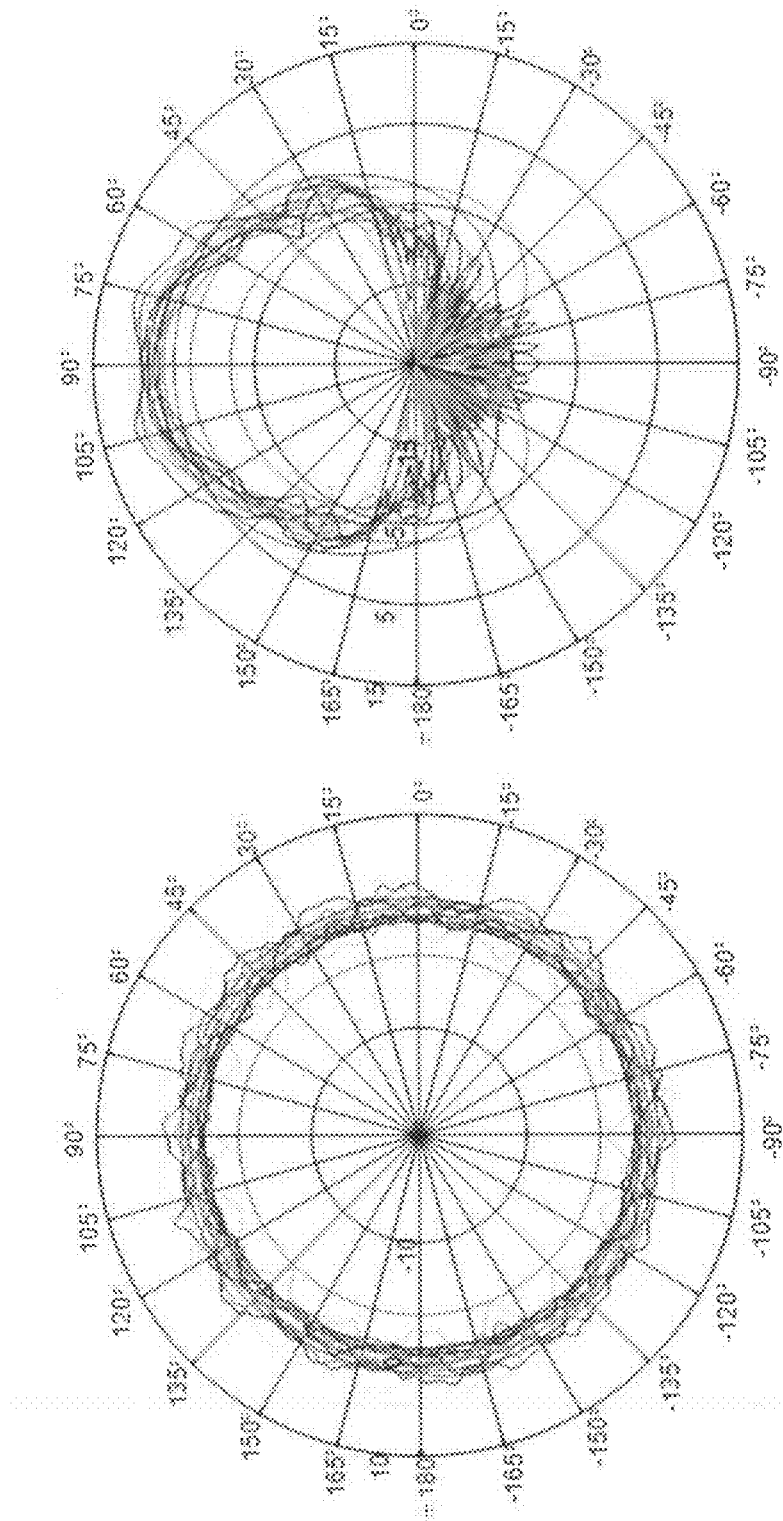

ULTRA-WIDEBAND LOW-PROFILE ELECTRONIC SUPPORT MEASURE ARRAY

FIELD OF THE DISCLOSURE

The present disclosure relates to electronic support measures and more particularly to direction finding using an ultra-wideband, low-profile array.

BACKGROUND OF THE DISCLOSURE

Typically, more than one aperture is required to cover a bandwidth of greater than four octaves. In addition, most wideband direction finding (DF) arrays are resistively loaded to reduce overmoding in order to preserve the desired amplitude and phase response for an accurate angle of arrival (AoA) solution. This loading can dramatically reduce gain by an order of magnitude, or more, relative to the dielectric lens array, thus compromising system sensitivity.

SUMMARY OF THE DISCLOSURE

One aspect of the present disclosure is a multi-element, ultra-wideband, circular array comprising a graded dielectric lens structure comprising, one or more disk-shaped lenses comprising, decreasing thickness from the center of the one or more disk-shaped lenses to an outward edge of the one or more disk-shaped lenses; and corresponding tapered dielectric constants wherein lower frequencies radiate from the center of the one or more disk-shaped lenses and higher frequencies radiate from the outward edge of the one or more disk-shaped lenses; and a plurality of circularly disposed elements; a plurality of transmit/receive (T/R) modules comprising a power amplifier (PA), a switch, and a low-noise amplifier (LNA) paired to each of the plurality of circularly disposed elements; and an RF transceiver to generate and receive signals, wherein the multi-element, ultra-wideband, circular array is configured to provide high efficiency and pattern stability over a frequency bandwidth that exceeds four octaves.

One embodiment of the multi-element, ultra-wideband, circular array is wherein the plurality of circularly disposed elements comprises sixteen elements spaced circumferentially at 22.5 degrees.

Another embodiment of the multi-element, ultra-wideband, circular array is wherein the RF transceiver is configured to generate omnidirectional signals. In some cases, the RF transceiver is configured to generate directional signals.

An embodiment of the multi-element, ultra-wideband, circular array is wherein the RF transceiver is configured to generate a first omnidirectional radiation mode that possesses a constant phase vs. azimuth angle and a second omnidirectional mode that possesses a linear phase vs. azimuth angle. In certain cases, measurement of an angle of a vector ratio of the first and second modes provides an unambiguous azimuth angle of arrival determination.

Yet another embodiment of the multi-element, ultra-wideband, circular array is wherein the array is configured to form sum/difference beams with adjacent pairs of elements to provide an alternate means of determining angle of arrival.

In certain embodiments, the array provides a scalable azimuth beamwidth by energizing some or all of the plurality of circularly disposed elements. In some cases, the array is configured to determine an unambiguous azimuthal angle of arrival using a single receiver by summing the first and the second omnidirectional modes with an additional phase shifter.

Yet still another embodiment of the multi-element, ultra-wideband, circular array of claim 1, wherein the lens array is low profile with a height of less than lambda/20 at the lowest frequency of operation.

Another aspect of the present disclosure is a multi-element, ultra-wideband, circular array is wherein the array is fed against a conducting groundplane or as a free-space antenna that does not require an RF counterpoise. In some cases, the array being fed as a free-space antenna does not require an RF counterpoise and has a second graded dielectric lens structure.

In some cases, multiple graded dielectric lens structures are stacked in elevation to provide enhanced gain and elevation angle of arrival determination in addition to azimuthal angle of arrival determination.

In certain embodiments of the multi-element, ultra-wideband, circular array, the graded dielectric lens structure utilizes a continuously variable dielectric gradient rather than discrete disk-shaped lenses.

Another aspect of present disclosure is a method of determining angle of arrival comprising providing a graded dielectric lens structure comprising, one or more disk-shaped lenses comprising, decreasing thickness from the center of the one or more disk-shaped lenses to an outward edge of the one or more disk-shaped lenses; and corresponding tapered dielectric constants wherein lower frequencies radiate from the center of the one or more disk-shaped lenses and higher frequencies radiate from the outward edge of the one or more disk-shaped lenses; and providing a plurality of circularly disposed elements; providing a plurality of transmit/receive (T/R) modules comprising a power amplifier (PA), a switch, and a low-noise amplifier (LNA) paired to each of the plurality of circularly disposed elements; and generating omnidirectional signals using an RF transceiver; generating a first omnidirectional mode that possesses a constant phase vs. azimuth angle; generating a second omnidirectional mode that possesses a linear phase vs. azimuth angle; measuring an angle of a vector ratio of the first and second modes; and determining an unambiguous azimuth angle of arrival over a frequency bandwidth that exceeds four octaves.

One embodiment of the method of determining angle of arrival further comprises generating directional signals. In some cases, the plurality of circularly disposed elements comprises sixteen elements spaced circumferentially at 22.5 degrees.

Another embodiment of the method of determining angle of arrival further comprises forming sum/difference beams with adjacent pairs of elements to provide an alternate means of determining angle of arrival.

Yet another embodiment of the method of determining angle of arrival is wherein determining an unambiguous azimuthal angle of arrival uses a single receiver by summing the first and the second omnidirectional modes with an additional phase shifter. In some cases, the graded dielectric lens structure utilizes a continuously variable dielectric gradient rather than discrete disk-shaped lenses.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A shows a side view of one embodiment of the low-profile graded dielectric lens array of the present disclosure comprising sixteen circularly disposed elements capable of coverage from 2 to 40 GHz.

FIG. 1B is an isometric view of one embodiment of the low-profile graded dielectric lens array of the present disclosure.

FIG. 2A shows an exploded view of one embodiment of the graded dielectric lens array of the present disclosure.

FIG. 2B shows elevation field of view (FOV) values from 30 to 0 degrees relative to the array waterline according to the system of the present disclosure which includes a conducting groundplane.

FIG. 3 shows azimuth radiation patterns at 0 degree elevation for one embodiment of the antenna of the present disclosure for use in the omnidirectional mode operation from 2 to 40 GHz.

FIG. 4 shows azimuth radiation patterns at 0 degree elevation for one embodiment of the antenna of the present disclosure for use in directional mode operation from 2 to 40 GHz.

DETAILED DESCRIPTION OF THE DISCLOSURE

Figure 5:
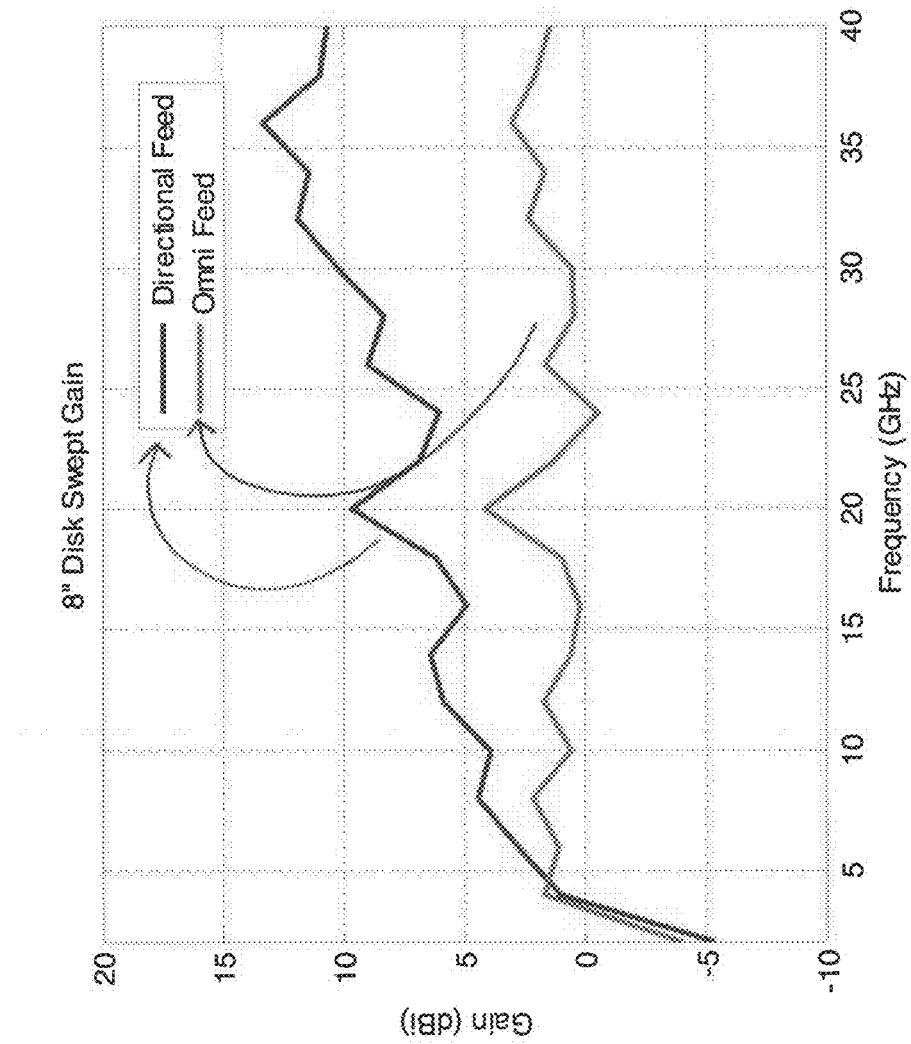
FIG. 5 shows swept gain at 0 degree elevation for the omnidirectional and directional modes of the embodiments of the system of the present disclosure from 2 to 40 GHz.

There is a need for low-cost, low SWAP, wideband situational awareness in the microwave and millimeter wave frequency bands to address existing and emerging threats. A key enabler for the system of the present disclosure is a wideband aperture capable of instantaneous operation from 2-40 GHz that does not require calibration or band-switching. Such an array provides a staring 360 degree azimuth field of view (FOV) enabling immediate detection of incoming threats and also provides a directional transmit mode to enable platform self-protection. The array has a small footprint and can be installed on land, air, and sea platforms.

It is understood that the availability of networked sensors that provide wideband situational awareness is a key enabler to understanding a battlespace. Currently, the barrier to widespread deployment of such sensors is largely related to cost and size. The present disclosure describes a solution to the problem having a 2-40 GHz direction finding (DF) array that requires a maximum of two RF channels with a single channel solution also being possible.

The system and method of the present disclosure uses a wideband dielectric lens array to instantaneously and unambiguously determining azimuthal AoA of RF energy over a frequency bandwidth of greater than four octaves. By forming two simultaneous omnidirectional modes with a constant and linear phase response versus azimuth respectively, the AoA of the incident RF signal can be determined unambiguously using a two channel receiver architecture that is capable of measuring the phase between the two modal outputs. In other embodiments, the receiver architecture can be simplified to require only a single channel by summing the modal outputs with an additional phase shifter and iteratively changing the phase to either peak or minimize the output. The AoA of the RF signal is related to the value of the phase shifter. This simplified implementation eliminates the phase tracking or compensation injection requirement of the dual channel architecture in exchange for an increased time to determine AoA.

The wideband dielectric array is capable of operating in a directional mode with a scalable azimuth beamwidth over a frequency bandwidth of greater than four octaves. As such, the array is suitable for Tx/Rx operation for EW, ESM, Radar and Communication applications.

One embodiment of the design of the present disclosure utilizes a circular dielectric lens array with multiple elements that are combined with wideband RF electronics to form two simultaneous omnidirectional modes, the ratio of which exhibits a linear phase relationship with azimuth. In addition to being broadband, the antenna of the present system provides >0 dBi gain across the majority of the band when fed in an omnidirectional mode. The antenna is also capable of being fed in a directional mode which provides between 5-10 dBi over the majority of the band. Thus, in addition to electronic support measure (ESM) functionality, the antenna is useful for broadband electronic attack (EA) applications. Adjacent applications such as low-cost collision avoidance radar for small UAV's is also possible.

The broadband nature of the present design allows for the use of very wideband waveforms that might be necessary for RF compatibility as the environment becomes increasingly dense.

In one embodiment of the system of the disclosure, a 16-element circular array is contained in a wideband graded dielectric lens and is capable of operating in a directional or omnidirectional mode depending on the application. For the wideband electronic support measure (ESM) mode mentioned above, two simultaneous modes are generated using all 16 elements. In some embodiments, Mode 0 excites all elements in-phase while Mode 1 excites all elements, where each element has a progressive 22.5 degree phase shift. There, Mode 0 provides an omnidirectional radiation pattern with uniform phase. Mode 1 provides an omnidirectional pattern with linear phase varying from −180 to 180 degrees. The angle of arrival (AoA) is unambiguously derived by measuring the phase of Mode 1 using Mode 0 as a reference. The gain of the omnidirectional mode is nominally 0 dBi across the band.

Referring to FIG. 1A, a side view of one embodiment of the low-profile graded dielectric lens array of the present disclosure comprising sixteen circularly disposed elements capable of coverage from 2 to 40 GHz is shown. This particular embodiment is fed against a conducting groundplane 10. Other embodiments of the design could include the mirror image to operate in free-space.

Still referring to FIG. 1A, one embodiment of the dielectric lens array of the present disclosure is shown. More specifically, the antenna is a circular array using a graded dielectric 2, 4, 6 to provide a wideband radiating structure. One embodiment contains a groundplane 10. A mounting collar 8 secures the element feeds and in some cases, secures corresponding RF cables 12. This particular design utilizes sixteen independent feed ports spaced circumferentially at 22.5 degrees. In one embodiment, all ports are fed simultaneously to generate an omnidirectional pattern in azimuth. In some cases, a subset of contiguous ports are fed to provide directional patterns with higher gain. In certain embodiments, this design leverages wideband low noise amplifiers (LNA), time delay units (TDU), and switch technology to provide a high level of integration between the antenna and beamforming electronics necessary for a low SWaP-C solution.

Referring to FIG. 1B, an isometric view of one embodiment of the low-profile graded dielectric lens array 1 of the present disclosure is shown. More particularly, Referring to FIG. 2A, an exploded view of one embodiment of the dielectric lens array of the present disclosure is shown. More specifically, the exploded view shows graded dielectric sections 2, 4, 6. The graded lens acts as a waveguide confining the RF energy in the radial direction until the frequency is such that cutoff frequency is exceeded at which point it radiates. Due the shaping of the lens, which tapers down in thickness and also dielectric constant from the center outward, lower frequencies radiate from the center of the disk while higher frequencies radiate from the outward edge. The geometry and dielectric gradient are optimized to provide high efficiency and pattern stability over a frequency bandwidth that exceeds four octaves. In large scale production, the dielectric sections could be injection molded to achieve a low recurring cost. Also, the dielectric gradient may be varied with finer resolution for improved performance. This present embodiment utilizes three unique dielectric materials appropriately shaped to achieve wide bandwidth operation 2, 4, 6. The feed structure of this array utilizes sixteen independent Vivaldi notch elements 14, circularly disposed to launch RF energy into the lens. In some embodiments, the system could use additional lenses. In certain embodiments, the system comprises a continuously changing dielectric antenna to provide for use over more than four octaves with a reduction of losses due to transitions between separate lenses.

Referring to FIG. 2B, elevation field of view (FOV) values from 30 to 0 degrees relative to the array waterline are shown according to the system of the present disclosure, which includes a conducting groundplane 10. Another embodiment of the array, which includes the mirror image of the array geometry would have an elevation FOV that ranges from −30 to +30 degrees.

Referring to FIG. 3, radiation patterns for one embodiment of the antenna of the present disclosure for omnidirectional mode operation are shown. More specifically, the omnidirectional mode is formed by summing all sixteen elements either in-phase or with a progressive 22.5 degree phase shift per element. The frequency range in FIG. 3 is 2 to 40 GHz.

Referring to FIG. 4, radiation patterns for one embodiment of the antenna of the present disclosure for directional mode operation are shown. More specifically, the directional mode is formed by summing four elements spanning a quadrant. This directional beam provides enhanced gain and azimuth discrimination. While FIG. 4 illustrates a quadrant beam, other directional modes can be formed by summing an arbitrary subset of the antenna elements. The frequency range in FIG. 4 is 2 to 40 GHz.

Referring to FIG. 5, swept gain for the omnidirectional and directional modes of certain embodiments of the present disclosure are shown. More specifically, the directional mode of operation provides a nominal 5 dB of gain improvement over the majority of the band. This results in higher Effective Isotropic Radiated Power (EIRP) and receive sensitivity. For T/R applications such as radar or communications, which use a common antenna, the directional mode results in a system performance improvement of 10 dB relative to the omnidirectional mode.

Figure 6B:
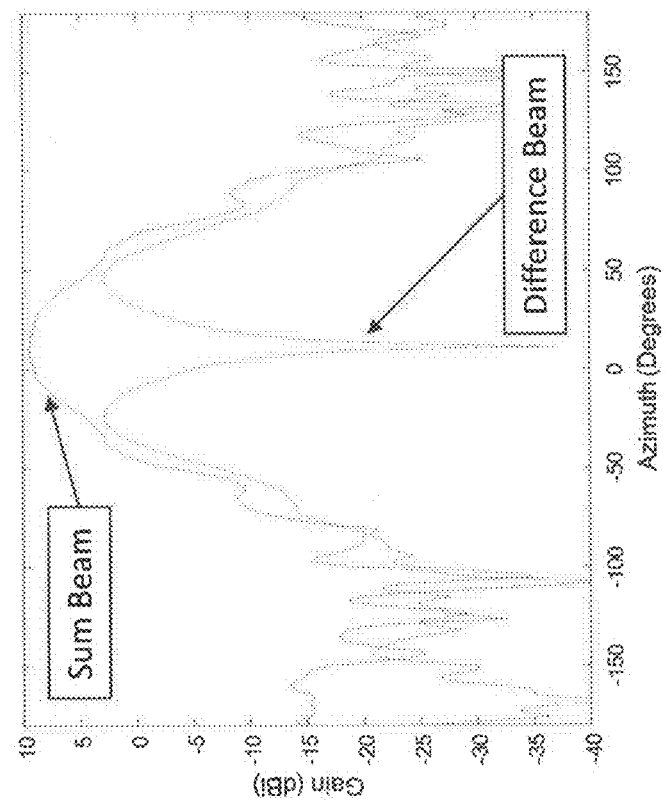
FIG. 6B shows a sum and difference beam generated by a pair of elements according to one embodiment of the present disclosure.
Figure 6A:
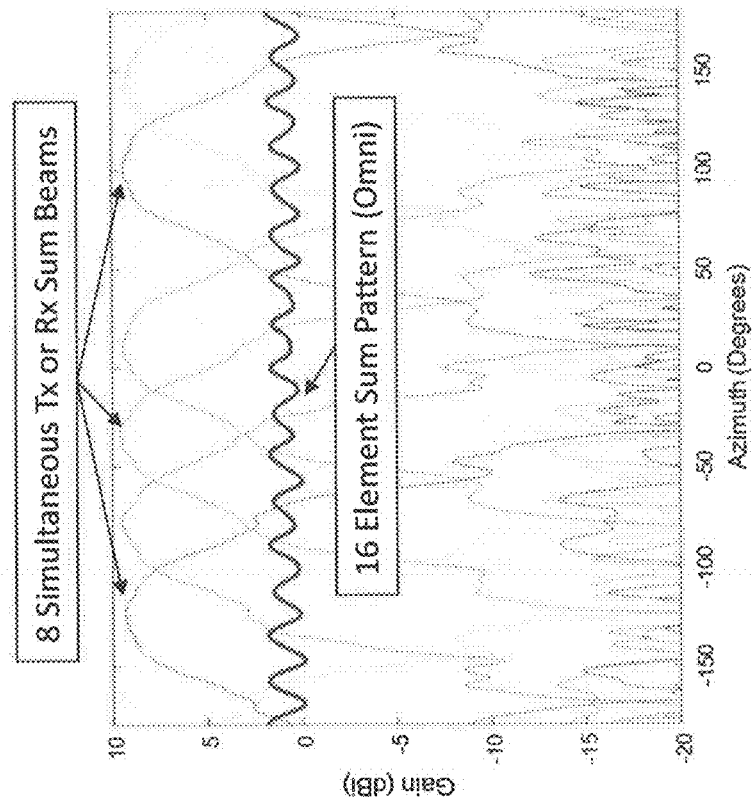
FIG. 6A shows two-element pair sum patterns for the eight directional beams covering 360 degrees in azimuth overlaid with the omnidirectional beam formed by the in-phase sum of all sixteen elements according to one embodiment of the present disclosure.

Direction finding (DF) processing can be accomplished using a number of standard techniques. One is traditional sum/difference processing that is used in many radar systems. FIG. 6A shows plots of eight simultaneous directional beams generated by the in-phase sum of adjacent elements along with the omnidirectional mode created by summing all elements in-phase as well as the sum and difference mode of a single beam as shown in FIG. 6B. The AoA can be determined by the amplitude ratio and phase of these two modes as is done in IFF and other systems. The bandwidth of operation in this mode is limited only by the in-phase and 180-degree combiners as the antenna structure supports a full 2-40 GHz bandwidth.

Referring to FIG. 6A and FIG. 6B, the simultaneous directional beams are shown in FIG. 6A, and the typical sum/difference pattern is shown in FIG. 6B. FIG. 6A shows two-element pair sum patterns for the eight directional beams covering 360 degrees in azimuth overlaid with the omnidirectional beam formed by the in-phase sum of all sixteen elements according to one embodiment of the present disclosure. FIG. 6B shows a sum and difference beam generated by a pair of elements according to one embodiment of the present disclosure. In FIG. 6B, the AoA is derived from the amplitude delta between the sum and difference beams and the phase is used to break the left right ambiguity. The relative amplitude and sign of the ratio between these two beams enables the computation of angle of arrival according to the principles of the present disclosure.

Another technique to determine AoA generates two simultaneous omnidirectional modes, one fed in-phase (constant phase with azimuth) for a sixteen element sum and the other sum of each element fed with a progressive 22.5 degree phase shift (linear phase relationship with azimuth) which provides unambiguous azimuth DF with a two-channel receiver. The two channel receiver provides for a simultaneous determination of AoA, however, the receiver system requires internal calibration to compensate for phase variation between channels which would otherwise introduce a bias error in the AoA.

Figure 7:
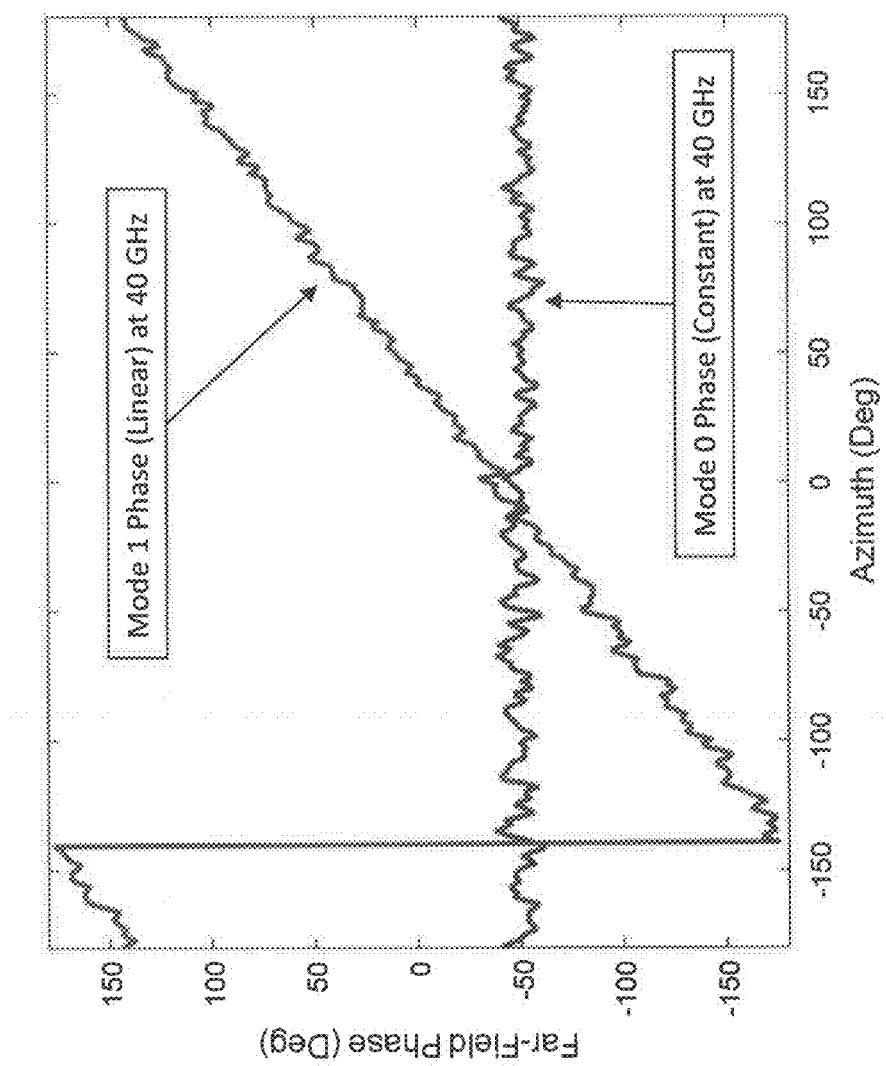
FIG. 7 shows a plot of phase vs. azimuth for the determination of angle of arrival for Mode 0 and Mode 1 omnidirectional modes according to the principles of the present disclosure.

Referring to FIG. 7, a plot of phase vs. azimuth for the determination of AoA for Mode 0 and Mode 1 omnidirectional modes according to the principles of the present disclosure is shown. The simulated phase of each mode at 40 GHz is shown in FIG. 7. There, Mode 0 is the in-phase sum and Mode 1 is the progressive phase sum. The angle of the vector ratio between these two modes provides a 1:1 correspondence to AoA of the RF signal. The ripple in the constant and linear phase patterns results in AoA error. The magnitude of this ripple is minimized over the large operating bandwidth by adjusting the array geometry and dielectric taper.

Figure 8:
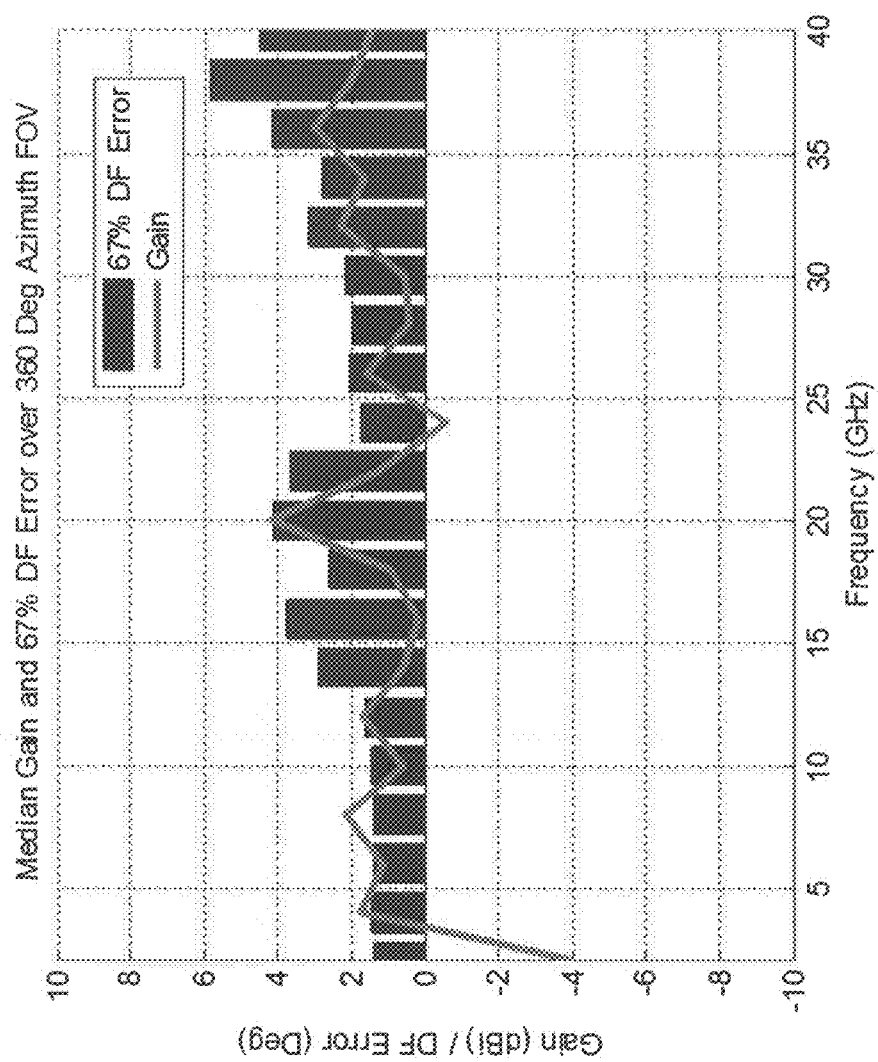
FIG. 8 shows a plot of the Mode 0 omnidirectional gain and the RMS (67% percentile) DF error versus frequency for one embodiment of the present disclosure.

Referring to FIG. 8, a plot of the omnidirectional gain and RMS DF error versus frequency is shown. These two curves are overlaid to illustrate that both sensitivity and RMS DF accuracy are maintained over a frequency bandwidth exceeding four octaves (e.g., 2 to 40 GHz). The plot of the Mode 0 omnidirectional gain and the RMS DF error versus frequency for one embodiment of the present disclosure illustrates the capability of the present embodiment to provide both high radiation efficiency and reasonable AoA accuracy over greater than four octaves of bandwidth.

The simulated gain and 67% DF error associated with the deviation from linear phase is exclusive of noise and other error sources (e.g., phase shifters, LNA, Combiners, etc. . . . ) and illustrates the stable behavior over a 2-40 GHz bandwidth. In general, requirements for the error tracking of these additional components are derived from the overall system performance requirements. In the case of detecting weak signals as is often required of a military system, maintaining high efficiency is critical to maximizing Signal-to-Noise ratio (SNR) and reducing noise-induced errors.

Figure 9:
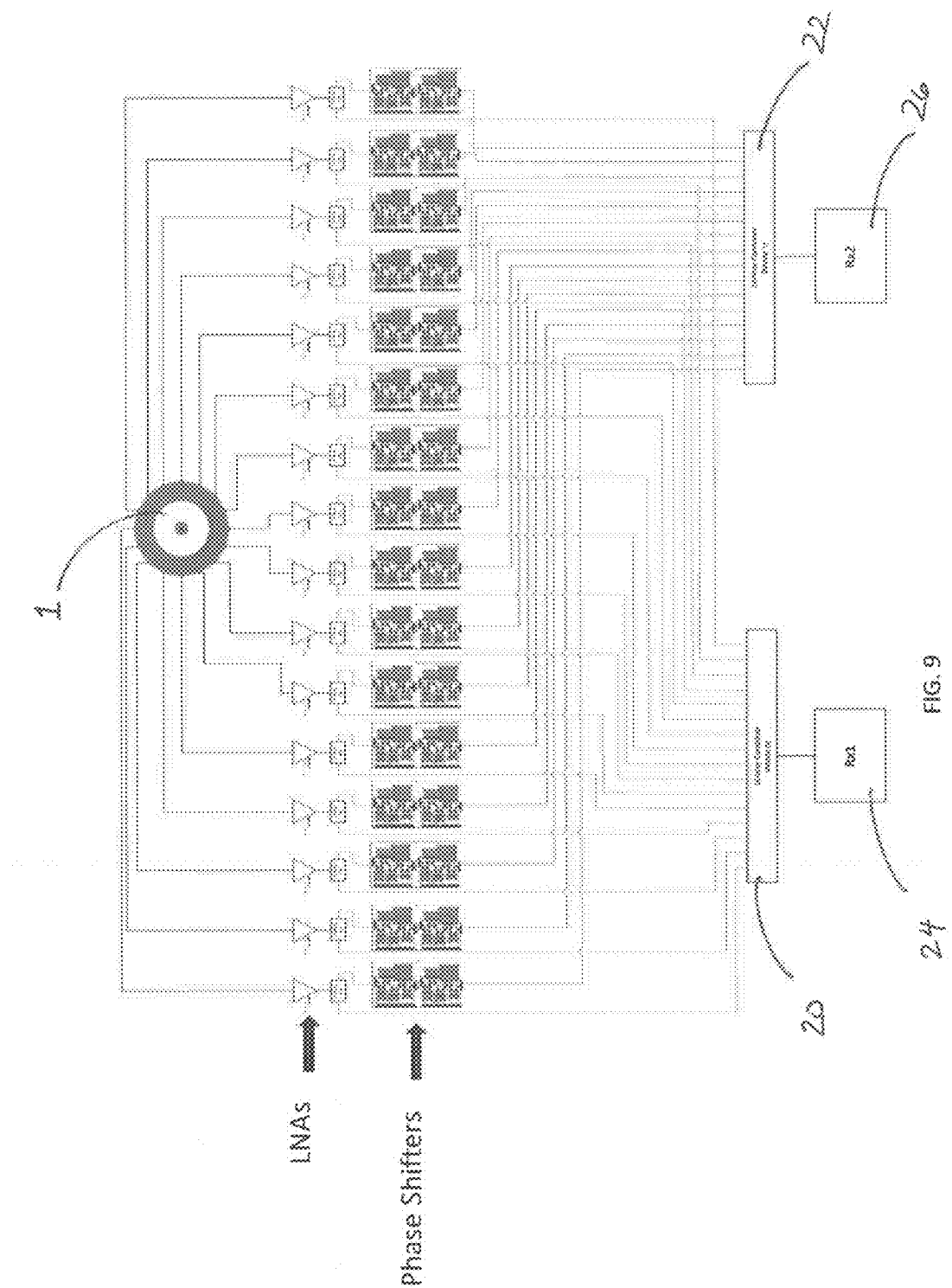
FIG. 9 shows a block diagram of a possible implementation of the system of the present disclosure incorporating the necessary components for form the two simultaneous omnidirectional modes used to unambiguously determine azimuth AOA
Figure 10B:
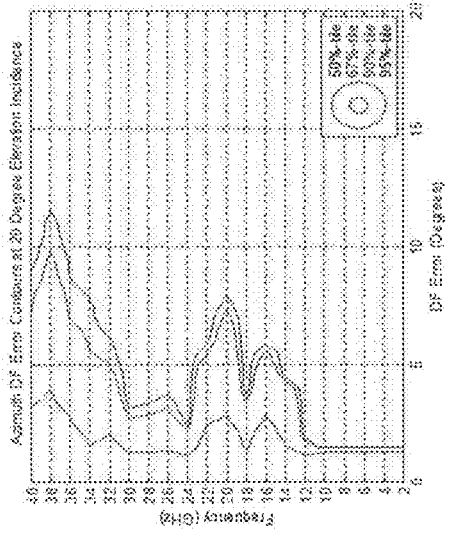
FIG. 10A-FIG. 10D show $50^{th}$, $67^{th}$, $90^{th}$ and $95^{th}$ percentile angle of arrival error contours at 0, +10, +20 and +30 degrees elevation, respectively, from 2-40 GHz.
Figure 10D:
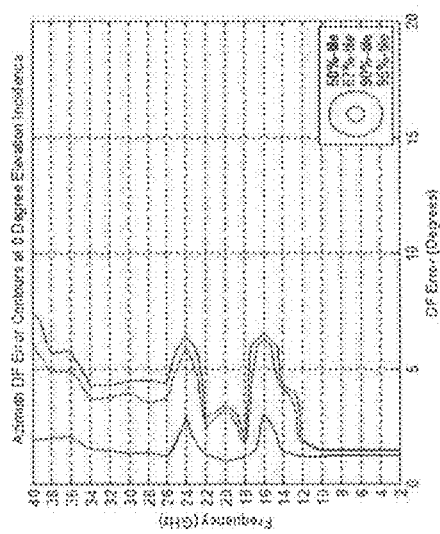
Figure 10A:
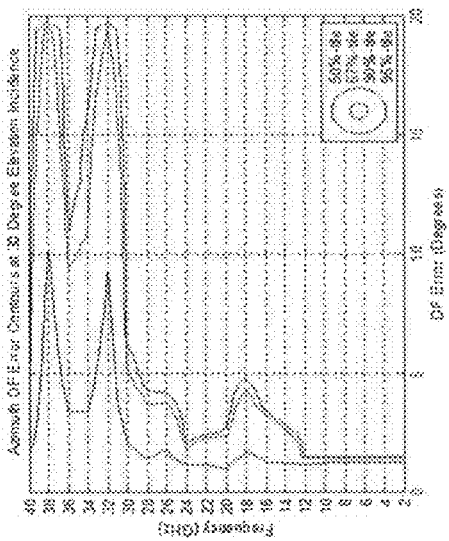
Figure 10C:
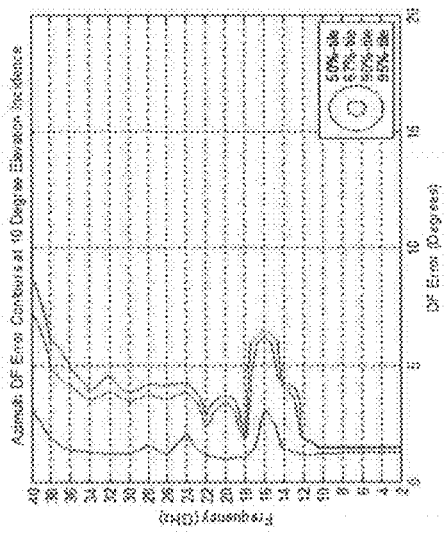

Referring to FIG. 9, a block diagram of one possible implementation of the system is shown incorporating the necessary components from two simultaneous omnidirectional modes used to unambiguously determine azimuth AOA. The system 1 has a series of LNAs and phase shifter and a first receiver 24 with a sixteen element combiner at Mode 0 20 and a second receiver 26 with a sixteen element combiner at Mode 1 22. There, the noise figure of the system is set primarily by the LNAs which reduces the impact of losses downstream (e.g., phase shifters and combiners). It may be possible to utilize GaN technology for the LNAs which have the benefit of being able to survive very high input power eliminating the need for a front-end limiter. The signal is split two-ways to form the simultaneous modes (0, 1). If a scanning receiver is used, the phase shifter may be implemented utilizing wideband time delay units (TDU) to provide the requisite phase shift over the system's instantaneous bandwidth.

In one embodiment of the system of the present disclosure, a cascade of 5-bit and 3-bit designs with 4 pico-Second (pS) resolution provides enough phase shift at 2 GHz for the largest required phase shift. Although the 4 pS resolution may not be sufficient to provide the minimum phase shift required at 40 GHz, values close to the required phase shift exist for at least one of the available delay states. Table 1 shows the error for all required feed phases at 2 and 40 GHz. The worst-case error standard deviation is 2 degrees, which will not adversely impact AoA performance.

TABLE 1

Phase Error vs. Element Position Utilizing TDU's as Phase Shifter

| | Element # | | | | | | | |
|---|---|---|---|---|---|---|---|---|
| | 2 | 3 | 4 | 5 | 6 | 7 | 8 | 9 |
| | | | | Phase State (Deg.) | | | | |
| | 22.5 | 45 | 67.5 | 90 | 112.8 | 135 | 157.5 | 180 |
| 2 GHz Phase Error | 0.54 | 1.08 | 1.26 | 0.72 | 0.18 | 0.36 | 0.90 | 1.44 |
| 40 GHz Phase Error | 6.30 | 1.80 | 4.50 | 3.60 | 2.70 | 5.40 | 0.90 | 7.20 |

| | Element # | | | | | | | |
|---|---|---|---|---|---|---|---|---|
| | 10 | 11 | 12 | 13 | 14 | 15 | 16 | |
| | | | Phase State (Deg.) | | | | | Error |
| | 202.6 | 225 | 247.5 | 270 | 292.5 | 315 | 337.5 | STD |
| 2 GHz Phase Error | 0.90 | 0.36 | 0.18 | 0.72 | 1.26 | 1.08 | 0.54 | 0.41 |
| 40 GHz Phase Error | 0.90 | 5.40 | 2.70 | 3.60 | 4.50 | 1.80 | 6.30 | 2.03 |

In certain embodiments, Mode 0 and Mode 1 are combined with an additional phase shifter. The direction of arrival is then estimated with a single channel receiver by cycling the phase shifter through a number of states in an effort to maximize or minimize the output. This may be done in a binary fashion to speed up the search for the peak state. The phase shifter value that maximizes or minimizes the RF output is the AoA with a known bias, which can be removed to calculate the actual AoA. Although this implementation may be slower than a dual-channel implementation, it is significantly cheaper since only a single channel would be required, thus eliminating the need for RF compensation between the two channels that is necessary to remove phase errors that can cause a bias in the AoA.

Referring to FIG. 10A-FIG. 10D, plots show $50^{th}$, $67^{th}$, $90^{th}$ and $95^{th}$ percentile AoA error contours at 0, +10, +20 and +30 degrees elevation, respectively, from 2-40 GHz.

Figure 11:
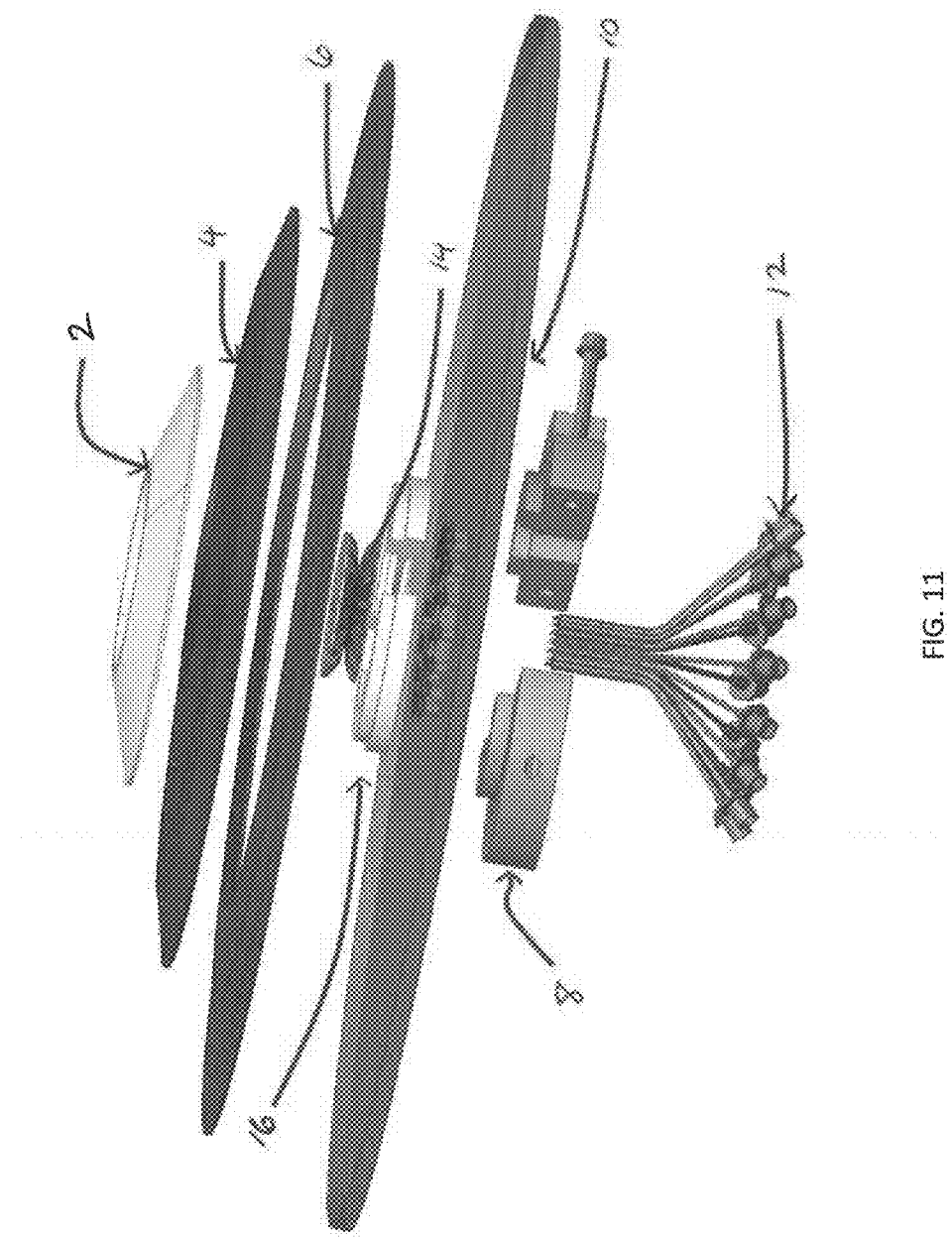
FIG. 11 shows an exploded view of the wideband array according to one embodiment of the system of the disclosure.

Referring to FIG. 11, an exploded view of the wideband array 1 according to one embodiment of the system of the disclosure is shown. More specifically, the shaped dielectric lens elements, 2, 4, 6, the sixteen element Vivaldi Notch exciter 14, the dielectric matching section 16 and mounting flange 8 are shown. Also, this particular embodiment depicts sixteen RF cables 12 as a means of interfacing to the antenna. In one embodiment these cables are replaced by T/R modules integrated in close proximity to the exciter to minimize losses.

FIG. 11 shows the major components that comprise the wideband array. The graded dielectric lens 2, 4, 6 utilize three unique dielectric sections with relative permittivity of 15, 5.5, and 3 moving radially outward. The lens array is excited with a sixteen element Vivaldi Notch array 14 which can be made significantly smaller than it would be in free-space due the relatively high dielectric constant of first section of the lens. Dielectric material is embedded within the notch assembly to facilitate impedance matching and hence efficient power transfer to the lens structure. The embodiment shown in FIG. 11 is designed to be in a half-space so it includes a conducting groundplane 10 to act as a counterpoise. A mounting ring 8 and RF cables 12 are connected on the bottom side of the RF groundplane 10 to secure the antenna and provide RF connections. Depending on the application, these RF cables may be replaced by electronic modules to facilitate the desired system implementation such as ESM, Radar or communications.

The structure of the antenna is somewhat application dependent. If, for example, the system is to be mounted to a vehicle then the groundplane would be used to provide for a FOV "above" or "below," depending on where the system is mounted (e.g., on top of a car, underneath a plane). If, on the other hand, the system is mounted on a mast, for example, a FOV of both "above" and "below" is provided by additional dielectric lenses being provided on the "underside" of the system shown in FIG. 1A in lieu of the groundplane.

One aspect of the present disclosure is a system comprising a wideband array, having front end electronics comprising limiters and low-noise amplifiers and a multichannel receiver used to provide ultra-wideband detection and AoA determination of signals of interest (SOI).

Another aspect of this system utilizes the same wideband array driven by a dedicated Transmit/Receive (T/R) module consisting of a power amplifier (PA), switch, and low-noise amplifier (LNA) at each element along with an RF transceiver to generate and receive directional or omnidirectional signals for communications, radar, and Electronic Warfare (EW) applications.

In one embodiment of the system, elements of the wideband array are combined to form two simultaneous omnidirectional modes. The first mode, denoted as Mode 0, is formed by summing all elements in-phase resulting in a far-field pattern that has a constant phase versus azimuth angle. The second mode, denoted as Mode 1, is formed by applying a progressive phase shift to each element of 360/N degrees, where N is the number of elements, prior to summation. This mode results in a far-field pattern that has a linear phase that varies from −180 to 180 degrees versus azimuth angle. The unambiguous angle of arrival of the signal is determined by the relative phase angle between Mode 0 and Mode 1.

In another embodiment of the system, adjacent pairs of elements are combined with a 180-degree hybrid providing a simultaneous sum and difference output per pair. This is done for each of the N/2 pairs of elements resulting in N/2 sum and N/2 difference patterns that cover the full 360 degree azimuth sector. The AoA of the signal is determined by first finding the sum beam, which has the peak signal amplitude and then comparing the amplitude ratio of that beam to the associated difference beam to determine the AoA. If amplitude only information is used, there will be an ambiguity as to whether the signal is to the left or right of the sum beam boresight. This ambiguity is readily resolvable by determining the sign of the ratio of the sum to difference beam, therefore the phase measurement needs only to be able to determine phase to a resolution of 180 degrees.

A third embodiment of the system integrates T/R modules at each element to provide omnidirectional or directional performance depending on the required application. Coverage in azimuth is readily scalable by energizing either all or a subset of N circularly disposed elements, e.g. N/2 elements would cover a 180-degree sector, N/4 elements would cover a 90-degree sector.

The receiver architecture can be simplified to require only a single channel by summing the modal outputs with an additional phase shifter and iteratively changing the phase to either peak or minimize the output. The AoA of the RF signal is related to the value of the phase shifter. This simplified implementation eliminates the phase tracking or compensation injection requirement of the dual channel architecture in exchange for an increased time to determine AoA. The wideband dielectric array is capable of operating in a directional mode with a scalable azimuth beamwidth over a frequency bandwidth of greater than 4 octaves. As such, the array is suitable for Tx/Rx operation for EW, ESM, Radar and Communication applications.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A multi-element, ultra-wideband, circular array comprising
    a graded dielectric lens structure comprising,
        one or more disk-shaped lenses comprising,
            decreasing thickness from the center of the one or more disk-shaped lenses to an outward edge of the one or more disk-shaped lenses; and
            corresponding tapered dielectric constants wherein lower frequencies radiate from the center of the one or more disk-shaped lenses and higher frequencies radiate from the outward edge of the one or more disk-shaped lenses; and
    a plurality of circularly disposed elements;
    a plurality of transmit/receive (T/R) modules comprising a power amplifier (PA), a switch, and a low-noise amplifier (LNA) paired to each of the plurality of circularly disposed elements; and
    an RF transceiver to generate and receive signals,
    wherein the multi-element, ultra-wideband, circular array is configured to provide high efficiency and pattern stability over a frequency bandwidth that exceeds four octaves.

2. The multi-element, ultra-wideband, circular array of claim 1, wherein the plurality of circularly disposed elements comprises sixteen elements spaced circumferentially at 22.5 degrees.

3. The multi-element, ultra-wideband, circular array of claim 1, wherein the RF transceiver is configured to generate omnidirectional signals.

4. The multi-element, ultra-wideband, circular array of claim 1, wherein the RF transceiver is configured to generate directional signals.

5. The multi-element, ultra-wideband, circular array of claim 3, wherein the RF transceiver is configured to generate a first omnidirectional radiation mode that possesses a constant phase vs. azimuth angle and a second omnidirectional mode that possesses a linear phase vs. azimuth angle.

6. The multi-element, ultra-wideband, circular array of claim 5, wherein measurement of an angle of a vector ratio of the first and second modes provides an unambiguous azimuth angle of arrival determination.

7. The multi-element, ultra-wideband, circular array of claim 1, wherein the array is configured to form sum/difference beams with adjacent pairs of elements to provide an alternate means of determining angle of arrival.

8. The multi-element, ultra-wideband, circular array of claim 1, wherein the array provides a scalable azimuth beamwidth by energizing some or all of the plurality of circularly disposed elements.

9. The multi-element, ultra-wideband, circular array of claim 5, wherein the array is configured to determine an unambiguous azimuthal angle of arrival using a single receiver by summing the first and the second omnidirectional modes with an additional phase shifter.

10. The multi-element, ultra-wideband, circular array of claim 1, wherein the lens array is low profile with a height of less than lambda/20 at the lowest frequency of operation.

11. The multi-element, ultra-wideband, circular array of claim 1, wherein the array is fed against a conducting groundplane or as a free-space antenna that does not require an RF counterpoise.

12. The multi-element, ultra-wideband, circular array of claim 11, wherein the array being fed as a free-space antenna does not require an RF counterpoise and has a second graded dielectric lens structure.

13. The multi-element, ultra-wideband, circular array of claim 1, wherein multiple graded dielectric lens structures are stacked in elevation to provide enhanced gain and elevation angle of arrival.

14. The multi-element, ultra-wideband, circular array of claim 1, wherein the graded dielectric lens structure utilizes a continuously variable dielectric gradient rather than discrete disk-shaped lenses.

15. A method of determining angle of arrival comprising providing a graded dielectric lens structure comprising,
   one or more disk-shaped lenses comprising,
      decreasing thickness from the center of the one or more disk-shaped lenses to an outward edge of the one or more disk-shaped lenses; and
      corresponding tapered dielectric constants wherein lower frequencies radiate from the center of the one or more disk-shaped lenses and higher frequencies radiate from the outward edge of the one or more disk-shaped lenses; and
providing a plurality of circularly disposed elements;
providing a plurality of transmit/receive (T/R) modules comprising a power amplifier (PA), a switch, and a low-noise amplifier (LNA) paired to each of the plurality of circularly disposed elements; and
generating omnidirectional signals using an RF transceiver;
generating a first omnidirectional mode that possesses a constant phase vs. azimuth angle;
generating a second omnidirectional mode that possesses a linear phase vs. azimuth angle;
measuring an angle of a vector ratio of the first and second modes; and
determining an unambiguous azimuth angle of arrival over a frequency bandwidth that exceeds four octaves.

16. The method of determining angle of arrival of claim 15, further comprising generating directional signals.

17. The method of determining angle of arrival of claim 15, wherein the plurality of circularly disposed elements comprises sixteen elements spaced circumferentially at 22.5 degrees.

18. The method of determining angle of arrival of claim 15, further comprising forming sum/difference beams with adjacent pairs of elements to provide an alternate means of determining angle of arrival.

19. The method of determining angle of arrival of claim 15, wherein determining an unambiguous azimuthal angle of arrival uses a single receiver by summing the first and the second omnidirectional modes with an additional phase shifter.

20. The method of determining angle of arrival of claim 15, wherein the graded dielectric lens structure utilizes a continuously variable dielectric gradient rather than discrete disk-shaped lenses.

* * * * *